(12) United States Patent
Becker et al.

(10) Patent No.: US 7,895,638 B2
(45) Date of Patent: Feb. 22, 2011

(54) PROTOCOL FOR ENTERING, DISABLING AND/OR ERASING SCRAMBLED DATA ACCESS RIGHTS AND THE CORRESPONDING ACCESS CONTROL MODULE

(75) Inventors: Claudia Becker, Rennes (FR); André Codet, Rennes (FR); Pierre Fevrier, Saint Sulpice la Foret (FR); Chantal Guionnet, Cesson Sevigne (FR)

(73) Assignee: Viaccess, Paris la Defense (FR)

( * ) Notice: Subject to any disclaimer, the term of this patent is extended or adjusted under 35 U.S.C. 154(b) by 1327 days.

(21) Appl. No.: 10/506,538

(22) PCT Filed: Mar. 6, 2003

(86) PCT No.: PCT/FR03/00721

§ 371 (c)(1),
(2), (4) Date: Jun. 21, 2005

(87) PCT Pub. No.: WO03/077500

PCT Pub. Date: Sep. 18, 2003

(65) Prior Publication Data

US 2005/0236475 A1    Oct. 27, 2005

(30) Foreign Application Priority Data

Mar. 8, 2002   (FR) .................................. 02 02969

(51) Int. Cl.
*G06F 7/04*       (2006.01)
*G06F 17/30*      (2006.01)
*H04N 7/16*       (2006.01)
*H04N 7/167*      (2006.01)
*H04L 9/32*       (2006.01)
*B41K 3/38*       (2006.01)
*H04K 1/00*       (2006.01)

(52) U.S. Cl. .............................. 726/2; 726/27; 713/168; 380/59; 380/201; 380/210; 380/255

(58) Field of Classification Search ..................... 726/2, 726/26, 27; 713/189; 380/59
See application file for complete search history.

(56) References Cited

U.S. PATENT DOCUMENTS 6,697,489 B1 *    2/2004   Candelore ................... 380/200

* cited by examiner

*Primary Examiner*—Nasser Moazzami
*Assistant Examiner*—Oscar A Louie
(74) *Attorney, Agent, or Firm*—Stites & Harbison PLLC; Jeffrey A. Haeberlin

(57) ABSTRACT

The invention relates to a protocol for disabling/erasing access rights to scrambled data. According to the invention, the access rights entered in an access control module comprise the following variables: right identification variable (R ID), action date variable (AD V) and right status variable (S V). The status variable can have one of three encoded values, namely enabled, disabled or erased right. The inventive protocol consists in: transmitting (A) at least one access right management message comprising the right identification variable (R $ID_x$), the action date variable (AD $V_x$) and the status assignment variable (S $V_x$), the latter corresponding to a enabled, disabled or erased right; assigning (B) the action date (AD $V_x$) of the message to the action date (AD V) of the right entered; and allocating (C) the status assignment variable (S $V_x$) of the message, corresponding to an enabled, disabled or erased access right, to the status variable (S V) of the entered access right. The invention is suitable for pay television.

15 Claims, 5 Drawing Sheets

Entry of an enabled right

*Disabling of a right*

Virtual erasure of a right

Physical erasure

PROTOCOL FOR ENTERING, DISABLING AND/OR ERASING SCRAMBLED DATA ACCESS RIGHTS AND THE CORRESPONDING ACCESS CONTROL MODULE

FIELD OF THE INVENTION

The protocols for entering, disabling and/or erasing scrambled data access rights are, at the present time, crucially important for providing the most fluid and most flexible service provision management possible in the field of scrambled data access control.

This is particularly the case in the field of pay television, a field in which the services or proposed service provisions tend to cover the most diverse services and provisions.

In particular, in the aforementioned field, the periodic renewal of a subscriber's subscriptions entails adding, entering, new data characterizing the extension or new subscription taken out by the subscriber.

BACKGROUND OF THE INVENTION

Given the independence between the management of the access rights subscribed and allocated to each subscriber and the access control proper, since access right management is handled via management messages, known as EMM messages, capable of conveying the access rights, and access control is handled by the transmission of access control messages, called ECM messages, comprising an encrypted access control word, serving as a service key and access criteria, such renewal involves entering new data into the memory of the security processor linked to the decoder or the access control module.

Since the access control module commonly comprises a bank card type microprocessor card, the latter's memory resources are necessarily limited.

For this reason, the aforementioned procedure for entering rights is accompanied by a function for erasing expired rights. However, the sole purpose of the latter function is to free up memory space in the access control module or the card, to avoid, ultimately, filling it to saturation.

Such an entry/erasure process cannot provide, with all the necessary flexibility and security, fluid management of the access rights entered in the access control module or the card allocated to each subscriber.

Such is the case, for example, following a payment lapse on the part of the subscriber, or even in the context of flexible offerings when the subscriber changes the offering to which he or she has subscribed.

Considering the security criterion, given the somewhat crude nature of the current erasure procedure, any unscrupulous subscriber would be able to filter and intercept the erasure messages designed to reduce or control the latter's access rights.

Moreover, a procedure for storing right entry EMM messages with a view to submitting the latter illegally to a replay procedure cannot be excluded.

Finally, the current right entry and/or erasure procedures by EMM messages can cause these operations to malfunction if an appropriate sequencing is not respected.

BRIEF SUMMARY OF THE INVENTION

The object of the present invention is to implement a method or protocol (herein referred to as a protocol) for entering, disabling and/or erasing scrambled data access rights, on the one hand to provide for an extremely flexible and fluid entered access rights control and management and, on the other hand, to significantly improve the level of security offered.

In particular, an object of the present invention is to implement a protocol for entering, disabling and/or erasing scrambled data access rights, in which each entry, disabling and/or erasure operation is made conditional on a prior reference, such as an action date.

Another object of the present invention is also to implement a protocol for entering, disabling and/or erasing scrambled data access rights, in which the access right entry, disabling and/or erasure operations can be encoded, to improve security and prevent corresponding intercepted command messages from being replayed.

Another object of the present invention is, finally, to implement an access control module enabling the entry, in the latter's programmable memory, of access rights and electronic purses for implementing the protocol that is the object of the present invention.

The protocol for entering, disabling and/or erasing scrambled data access rights, the object of the invention, is implemented for scrambled data transmitted from a transmission center to at least one descrambling terminal, to which is linked an access control module equipped with a security processor. The access rights are entered in the access control module and the scrambled data is subjected to an access control by periodic transmission of access control messages, conveying access criteria and a cryptogram of a control word that is changed periodically and encrypted using an operation key, then, in each security processor, conditionally upon verifying the true value of at least one entered access right against the access criteria, by decrypting the cryptogram of the control word using the operation key, then transmitting the restored control word to the descrambling terminal and descrambling the scrambled data using the latter.

It is noteworthy in that it consists at least in forming any access right entered in the access control module as a set of independent variables and linked variables comprising at least, in addition to an access right identification variable, an entered access right action date variable and a status variable which can have one of three encoded values signifying access right enabled, access right disabled, access right erased, transmitting from the transmission center to each descrambling terminal and to the access control module linked to the latter at least one access right management message, this message comprising at least, in addition to an entered access right identification variable, an action date variable and a status assignment variable, the encoded value corresponding to an enabled access right, a disabled access right or an erased access right.

On receipt of the access right management message, it consists, finally, at the access control module, in assigning the action date to the entered access right corresponding to the access right identification variable of the access right management message, and allocating the status assignment variable corresponding to an enabled access right, a disabled access right or an erased access right to the corresponding entered access right status variable.

The module controlling access to scrambled data transmitted from a transmission center to at least one descrambling terminal to which is linked this access control module, the object of the present invention, is noteworthy in that it comprises, entered in the memory of this access control module, at least one access right formed by a set of independent variables and of linked variables, this set of variables comprising at least, in addition to an entered access right identification variable and a validity dates variable, an entered access right action date variable and a status variable that can have one of three encoded values signifying access right enabled, access right disabled or access right erased.

The protocol and the access control module, the objects of the present invention, can be applied, not just in the point-to-multipoint transmission of scrambled data, in particular pay television, but also in the point-to-point transmission of video image data or service execution data, in a network, according to the IP protocol for example.

BRIEF DESCRIPTION OF THE DRAWINGS

They will be better understood by reading the description and remarks concerning the drawings below, in which.

DETAILED DESCRIPTION OF EXEMPLARY EMBODIMENTS OF THE INVENTION

A more detailed description of the protocol for entering, disabling and/or erasing scrambled data access rights, conforming to the object of the present invention, will now be given in conjunction with FIG. 1 and the following figures.

As a general rule, it should be remembered that the protocol, the object of the present invention, is used to manage the access rights to scrambled data transmitted from a transmission center to a plurality of descrambling terminals. Each terminal $T_k$ has an associated access control module fitted with a security processor.

Conventionally, each access control module can comprise a microprocessor card containing the aforementioned security processor, and secure memories for storing decryption keys and, finally, any authenticity check operation for example. Each access control module is fitted with a programmable non-volatile memory and scrambled data access rights are entered in the access control module, into the aforementioned programmable non-volatile memory.

The scrambled data is subjected to an access control by periodic transmission of access control messages, known as ECM messages. These access control messages convey access criteria and a cryptogram of a control word that is changed periodically and encrypted using an operation key.

In each security processor, conditionally upon verifying the true value of at least one entered access right against the access criteria conveyed by the access control messages, the access control is performed by decrypting the cryptogram of the control word using the operation key, stored in the security processor's secured non-volatile memory, by transmitting the control word restored by the access control module to the descrambling terminal, then descrambling the scrambled data using the restored control word in the aforementioned descrambling terminal.

In the context of an aforementioned scrambled data access control procedure, the protocol, the object of the present invention, is noteworthy in that it at least consists in forming and defining any access right entered in the access control module as a set of independent variables and linked variables. These variables comprise at least, in addition to an access right identification variable and a validity dates variable, an access right action date variable entered in the access control module and a status variable that can have one of three encoded values, namely access right enabled, or access right disabled, or access right erased.

Figure 1:
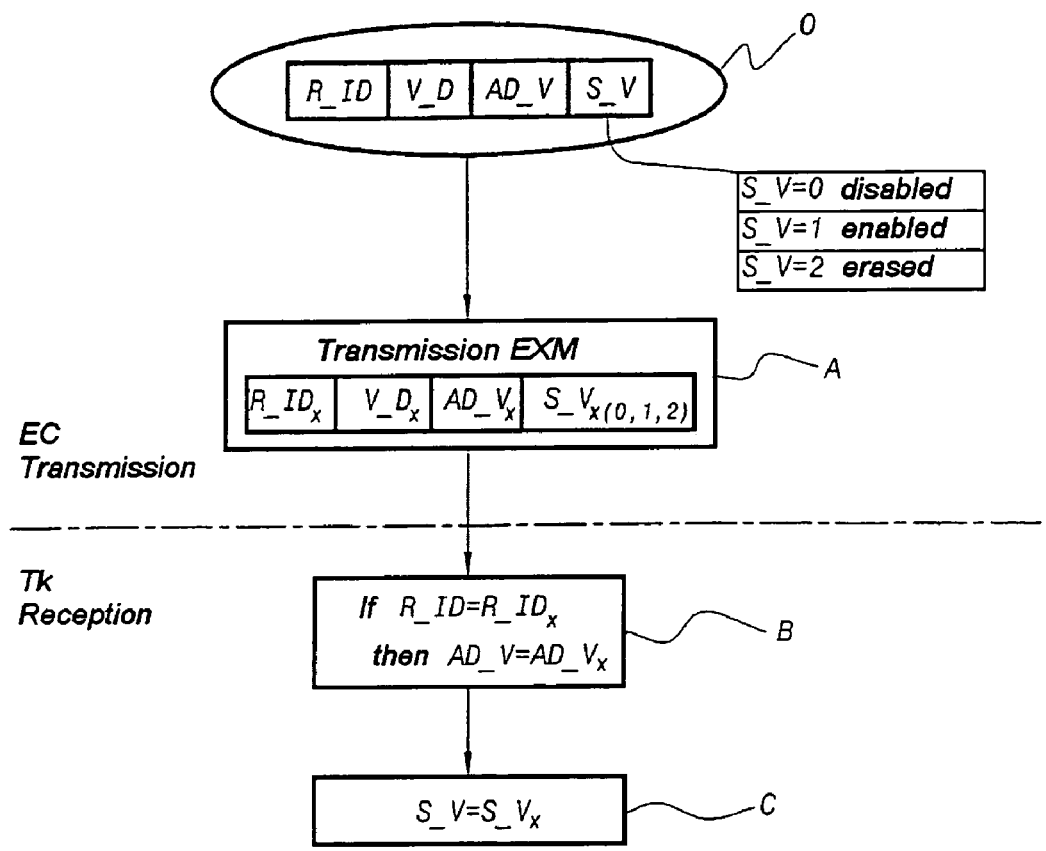
FIG. 1 represents, by way of illustration, a general flow diagram of the steps for implementing the protocol that is the object of the present invention.

Referring to the aforementioned FIG. 1, the following conventions are used:
R_ID: access right identification variable;
V_D: validity dates variable;
AD_V: entered access right action date variable;
S_V: status variable that can have one of three encoded values, namely access right enabled, access right disabled, or access right erased.

By way of non-limiting example, it is indicated that the three encoded values could correspond to:
S_V=0 for a disabled right;
S_V=1 for an enabled right;
S_V=2 for an erased right.

Given the preceding considerations, it is naturally understood that the definition and formation of the access rights, as mentioned previously in the description, are essential to the implementation of the protocol that is the object of the present invention. This step is represented in step O of FIG. 1 and each access right AR can then correspond to the following syntax:

$$AR=[V\_D] \; R\_ID \; [R\_SID] \; AD\_V \; S\_V \qquad (1)$$

Referring to the aforementioned relation, it is indicated that, in accordance with the specific encoding of the aforementioned access rights, any variable between square brackets is considered to be optional.

While the validity dates variable V_D is an independent variable, it can be made optional for specific encoding reasons, the absence of validity dates variable, for an entered access right, possibly corresponding to a particular value of this right for example.

Conversely, the variable R_SID, a right sub-identification variable, is a variable linked to the access right identification variable R_ID.

In these conditions, the presence of the independent access right identification R_ID, action date AD_V and status S_V variables is considered necessary for the implementation of the protocol that is the object of the present invention, the latter being mainly implemented for entered access rights and comprising, even though optionally, a validity date variable.

Thus, referring to the above relation (1), it should be understood that for these variables:
V_D: indicates a validity date interval, which can be fixed and represented by an access right start date and end date or rolling and defined then as a number of days, or by an expiry date. The validity interval can then be converted to a fixed value on first use for example.

R_ID and R_SID: the aforementioned variables correspond to identifiers and sub-identifiers of the entered right and are, naturally, used to reference this right in the access criteria conveyed by the access control messages ECM.

AD_V: indicates the date on which an operation was performed on the entered right. More specifically, it is indicated that the aforementioned variable indicates either the date of entry of the right entered in the card when no operation has been performed on the latter or, on the contrary, the date of execution, action date, of the last subsequent operation and, in particular, the date of updating, the date of disabling or even the date of erasure, as will be described later in_the description.

S_V: indicates the encoded value of the status variable. Referring to FIG. 1, it is indicated that this encoded variable can have the values 0, 1, 2 mentioned previously or any other explicit or encrypted value for example.

Referring to FIG. 1, the step for forming and defining the access rights, as mentioned previously, is considered to be complete.

Following the aforementioned step O, the protocol, the object of the present invention, consists in a step A, in transmitting, from the transmission center to each descrambling terminal $T_k$ and, naturally, to the access control module linked to the latter, at least one access rights management message denoted EXM message.

This message comprises, as shown in FIG. 1, at least an entered access rights identification variable, this variable being denoted $R\_ID_x$, an action date variable denoted $AD\_V_x$, this action date corresponding to the date of transmission of the management message, in other words the date of the management operation performed on the entered access right for which the identification variable R_ID corresponds to the identification variable $R\_ID_x$ contained in the management message, as will be explained below in the description. The message can, moreover, include a validity dates variable, denoted $V\_D_x$. Finally, the management message EXM includes a status assignment variable denoted $S\_V_x$ formed by an encoded value corresponding to an enabled access right, a disabled access right or an erased access right. The variable $S\_V_x$ can then take the values 0, 1, 2, as mentioned previously in the description.

On receipt of the EXM management message in the access control module linked to the descrambling terminal, the protocol, the object of the invention, consists, in a step B, in assigning the action date to the entered access right corresponding to the access right identification variable in the access rights management message, then, in a step C, in allocating, to the status variable S_V of the entered access right, the status assignment variable $S\_V_x$ corresponding to an enabled access right, a disabled access right or an erased access right.

Regarding the implementation of step B, it is indicated that this step can be implemented by the use of a logical If . . . Then type command.

In these conditions, the aforementioned step B, as represented in FIG. 1, can consist in comparing the value of the entered access right identification variable R_ID with the entered access rights identification variable contained in the EXM management message, in other words with the variable $R\_ID_x$ by match comparison. The aforementioned match comparison can comprise a plurality of successive comparisons relating to the variables such as right sub-identification variable R_SID and validity dates variable, or, if appropriate, to any other variable.

When this match is verified, then the action date variable AD_V is allocated, conditionally, the value of the action date variable $AD\_V_x$ in the EXM management message. The aforementioned condition consists in verifying the posteriority of the variable $AD\_V_x$ against the variable AD_V. Then, the status assignment variable $S\_V_x$ contained in the EXM management message is allocated to the status variable of the entered access. This operation is carried out, in step C, by instantiating the right S_V status variable of the entered access right S_V represented by the equality:

$$S\_V = S\_V_x$$

A more detailed description of the implementation of the protocol that is the object of the present invention, in the context of operations to enter an enabled right, disable a right then erase an entered right, will now be given in conjunction with FIGS. 2a to 2d.

For an operation to enter a defined access right in an access control module, the action date variable $AD\_V_x$ in the EXM management message, corresponds to a date of entry of this access right and the assignment variable $S\_V_x$ is an encoded value corresponding to an enabled right, in other words to the encoded value $S\_V_x = 1$.

The operation proper to enter the access right consists in entering, into the access control module, and in particular into the latter's non-volatile memory, a defined access right, the action date of which is that of the aforementioned entry date and for which the status variable is that of the status variable $S\_V_x = 1$.

Figure 2A:
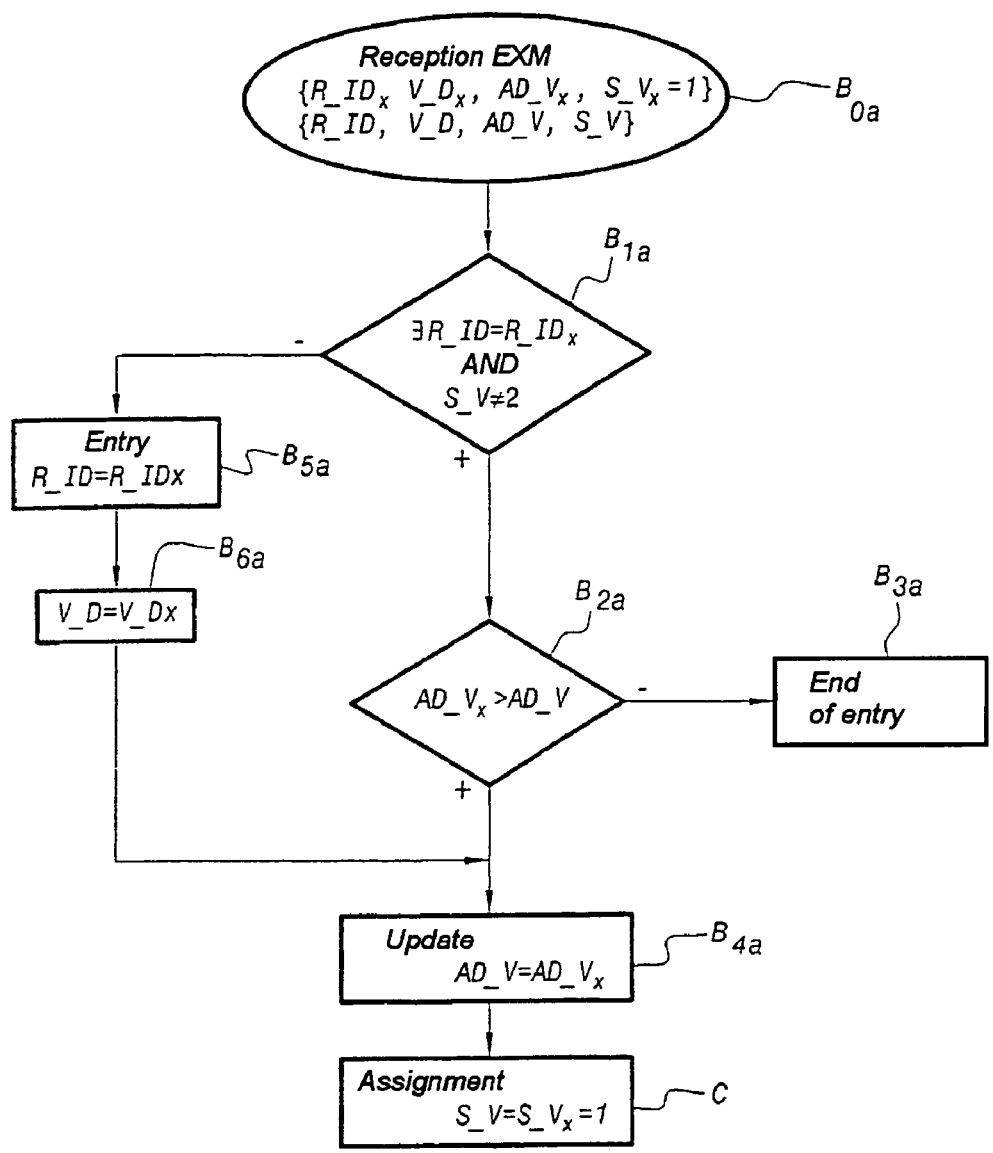
FIG. 2a represents, by way of illustration, a specific flow diagram of the steps for implementing the protocol that is the object of the present invention, in an operation to enter an enabled right, in the access control module allocated to a subscriber.

Referring to FIG. 2a, the entry operation begins with the receipt, at the descrambling terminal $T_k$, of the EXM message, in step $B_{0a}$.

After demultiplexing of the EXM message, the access control module then has the variables $R\_ID_x$, $V\_D_x$, $AD\_V_x$, $S\_V_x = 1$ derived from the EXM message and the variables R_ID, V_D, AD_V, S_V of the right entered in the access control module, if the right is actually entered.

For the aforementioned entry operation, the protocol that is the object of the present invention can consist, as represented in FIG. 2a, in verifying, in a step $B_{1a}$, the existence of a corresponding entered right. This test is denoted:

$$\exists\ R\_ID = R\_ID_x.$$

This test is accompanied by a test to ensure that this right does not belong to the erased state, $S\_V \neq 2$, in order to allow the entry operation to be executed for existing rights in the disabled state or the entered state, for the purpose of a re-entry operation concerning the latter. The test implemented in step $B_{1a}$ verifies the relation:

$$\exists\ R\_ID = R\_ID_x\ \text{AND}\ S\_V \neq 2.$$

On a positive response to step $B_{1a}$, the protocol that is the object of the invention can consist in verifying the posteriority nature of the action date variable corresponding to an entry date in relation to the corresponding access right action date. This operation can be carried out, in step $B_{2a}$, by comparing the superiority of the action date and the action date variable $AD\_V_x$ contained in the EXM message in relation to the entered right action date AD_V.

On a negative response to the test of the aforementioned step $B_{2a}$, the entry operation is terminated by an end-of-entry step $B_{3a}$, the operation to enter the right not being completed.

Contrary to this, on a positive response to the test of step $B_{2a}$, the latter is then followed by a step $B_{4a}$ consisting in updating the action date variable of the corresponding access right based on the action date corresponding to an entry date.

This operation is represented by the relation:

$$AD\_V = AD\_V_x$$

The update step $B_{4a}$ is then followed by the assignment step C consisting in assigning, to the identical access right status variable S_V, the encoded value corresponding to an enabled right, or $S\_V_x = 1$. The access right entered previously in the access control module is then renewed or updated.

The protocol that is the object of the present invention for an entry operation can, naturally, be implemented in respect of the execution of a first entry of a right into an access control module.

In such a situation, there is no entered right corresponding to the access right identification variable in the EXM message, variable $R\_ID_x$, and the relation match comparison in the test carried out in step $B_{1a}$ is not verified.

Consequently, on a negative response to the test of the aforementioned step, negative response to the verification of the relation $\exists R\_ID = R\_ID_x$ AND $S\_V \neq 2$, the protocol that is the object of the invention consists, in addition, in performing an update by first entry of this access right for which the action date corresponds to the entry date.

This operation is represented, in FIG. 2a, by the access, on a negative response to the step $B_{1a}$, to the update step $AD\_V = AD\_V_x$.

This access can be carried out by assigning to the variable R_ID of the right for which entry is being performed, in step $B_{5a}$, the value $R\_ID_x$ contained in the EXM management message, then in step $B_{6a}$, the validity dates variable $V\_D_x$ to the validity variable V_D.

The assignment operation, in step C, corresponds, in this case, to a first entry.

Similarly, referring to FIG. 2a, for an entered access right for which the status assignment variable corresponds to a right that has been erased, but is still physically present, S_V=2, this also consists on a negative response to test $B_{1a}$, advantageously, in performing a new entry of the right, steps $B_{5a}$, $B_{6a}$ and $B_{4a}$. This entered access right is then assigned a status variable corresponding to an enabled right, step C.

A more detailed description of an operation to disable an access right entered in an access control module conforming to the protocol that is the object of the present invention will now be described in conjunction with FIG. 2b.

In such a situation, the action date variable of the access rights management message corresponds to a disabling date and the status assignment variable $S\_V_x$ is the encoded value corresponding to a disabled right, namely the value zero in the example given previously in the description.

In these conditions, the operation to disable the right entered in the access control module consists in assigning, to the status variable of the entered access right S_V, the encoded value corresponding to a disabled access right, namely the encoded value $S\_V_x = 0$ and, naturally, updating the action date of the entered access right based on the disabling date.

Figure 2B:
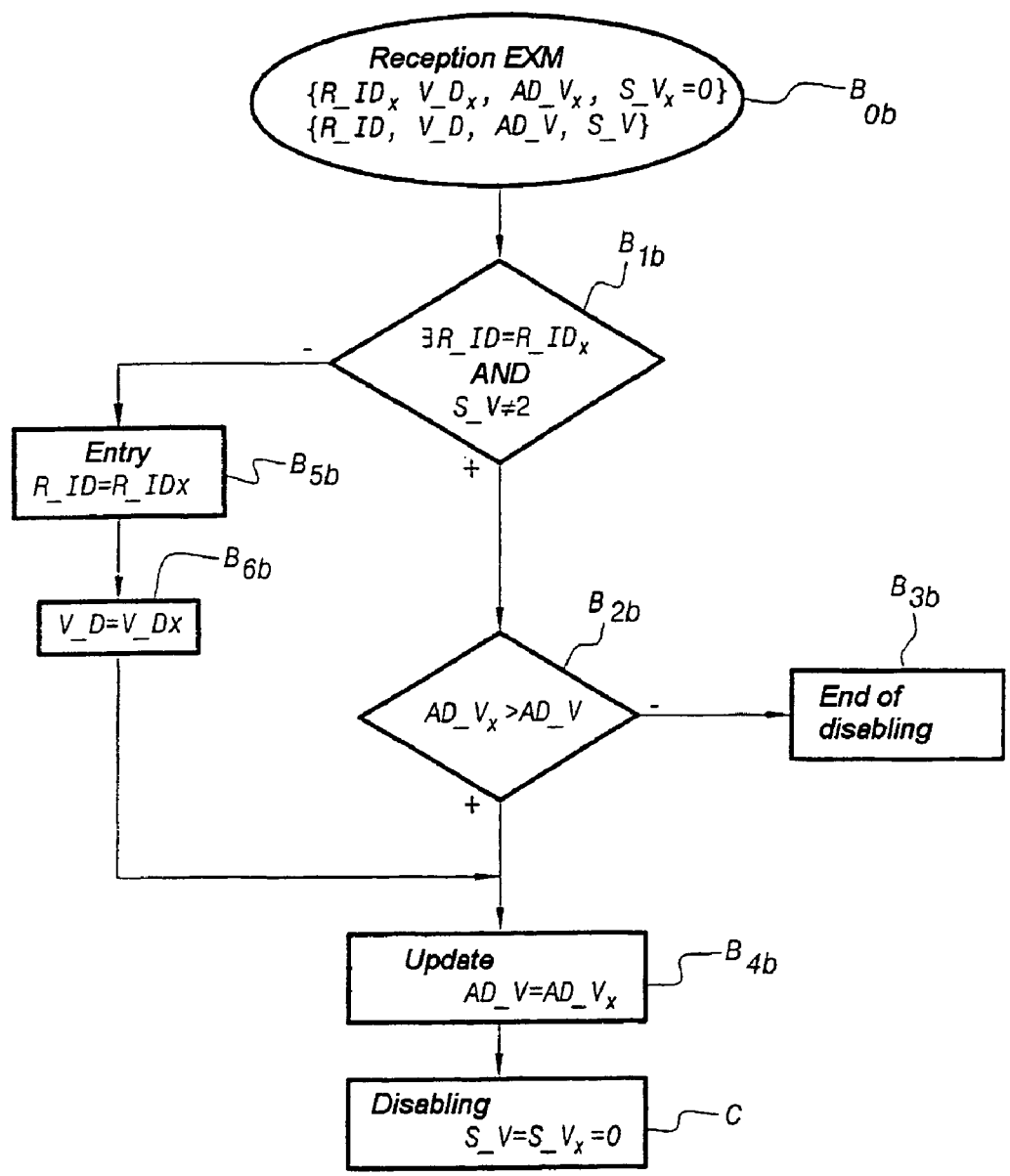
FIG. 2b represents, by way of indication, a specific flow diagram of the steps for implementing the protocol that is the object of the present invention, in an operation to disable a right entered in the access control module allocated to a subscriber.

To this end, as represented in FIG. 2b, the disabling operation begins with a step for receiving the EXM management message relating to this operation at the descrambling terminal $T_k$.

In this step, referenced $B_{0b}$ in FIG. 2b, there are the access right identification variable $R\_ID_x$, validity date variable $V\_D_x$, action date variable $AD\_V_x$ and status assignment variable $S\_V_x = 0$ contained in the EXM message, and the right assignment variable R_ID, validity date variable V_D, action date variable AD_V and status variable S_V of the right entered in the access control module.

In these conditions, the protocol that is the object of the present invention can consist, as represented in FIG. 2b, prior to the disabling operation proper, in verifying, in a step $B_{1b}$, on the access control module, the existence of a corresponding entered access right. The test $B_{1b}$ is similar to the test $B_{1a}$ in FIG. 1a.

Moreover, and in a non-limiting manner, this test operation can consist in verifying, as in test $B_{1a}$ in FIG. 1a, that the corresponding entered access right is an enabled or disabled access right on which the disabling operation must be performed.

For this reason, the test performed in step $B_{1b}$ verifies the relation:

$$\exists R\_ID = R\_ID_x \text{ AND } S\_V \neq 2.$$

On a positive response to step $B_{1b}$, the latter can then be followed by a step $B_{2b}$ consisting in verifying the posteriority nature of the action date variable corresponding to a disabling date with respect to the action date variable of the entered right. This operation is carried out, in test step $B_{2b}$, according to the relation:

$$AD\_V_x > AD\_V.$$

On a negative response to the aforementioned test $B_{2b}$, as represented in FIG. 2b, a call to an end of disabling step $B_{3b}$ can be made, such an operation being used to introduce a security measure in the disabling operation proper.

Contrary to this, on a positive response to the test performed in step $B_{2b}$, an action date update step is performed in step $B_{4b}$, this update operation verifying the same relation as the update step on entering an enabled right $B_{4a}$ in FIG. 2a.

Step $B_{4b}$ is then followed by the disabling proper step C consisting in assigning the encoded value corresponding to a disabled right $S\_V_x = 0$ to the status variable of the entered access right S_V.

Referring to FIG. 2b, the protocol that is the object of the present invention can in addition be implemented to disable an erased access right still present on the access control module, S_V=2. In such a case, it consists, on a negative response to the aforementioned step $B_{1b}$, in performing the update of step $B_{4b}$ then the disabling operation in step C, $S\_V = S\_V_x = 0$. As in the case of FIG. 2a, the step $B_{4b}$ can then be implemented following a step $B_{5b}$ and a step $B_{6b}$ similar to the steps $B_{5a}$ and $B_{6a}$ respectively in FIG. 2a.

In the aforementioned situations, the protocol that is the object of the invention consists in performing an update of the access right by entering an access right for which the action date corresponds to a disabling date. This entered access right is assigned a status variable corresponding to a disabled access right.

The aforementioned operations are used to position, or enter, a right in the disabled state to prevent its subsequent entry by means of a message with an earlier action date.

A more detailed description of an operation to erase an entered access right, implemented in accordance with the protocol that is the object of the present invention, will now be given in conjunction with FIGS. 2c and 2d.

An operation to erase an entered access right is, in these conditions, performed on the basis of an EXM message for which the status assignment variable $S\_V_x = 2$ corresponds to an erased access right.

Figure 2C:
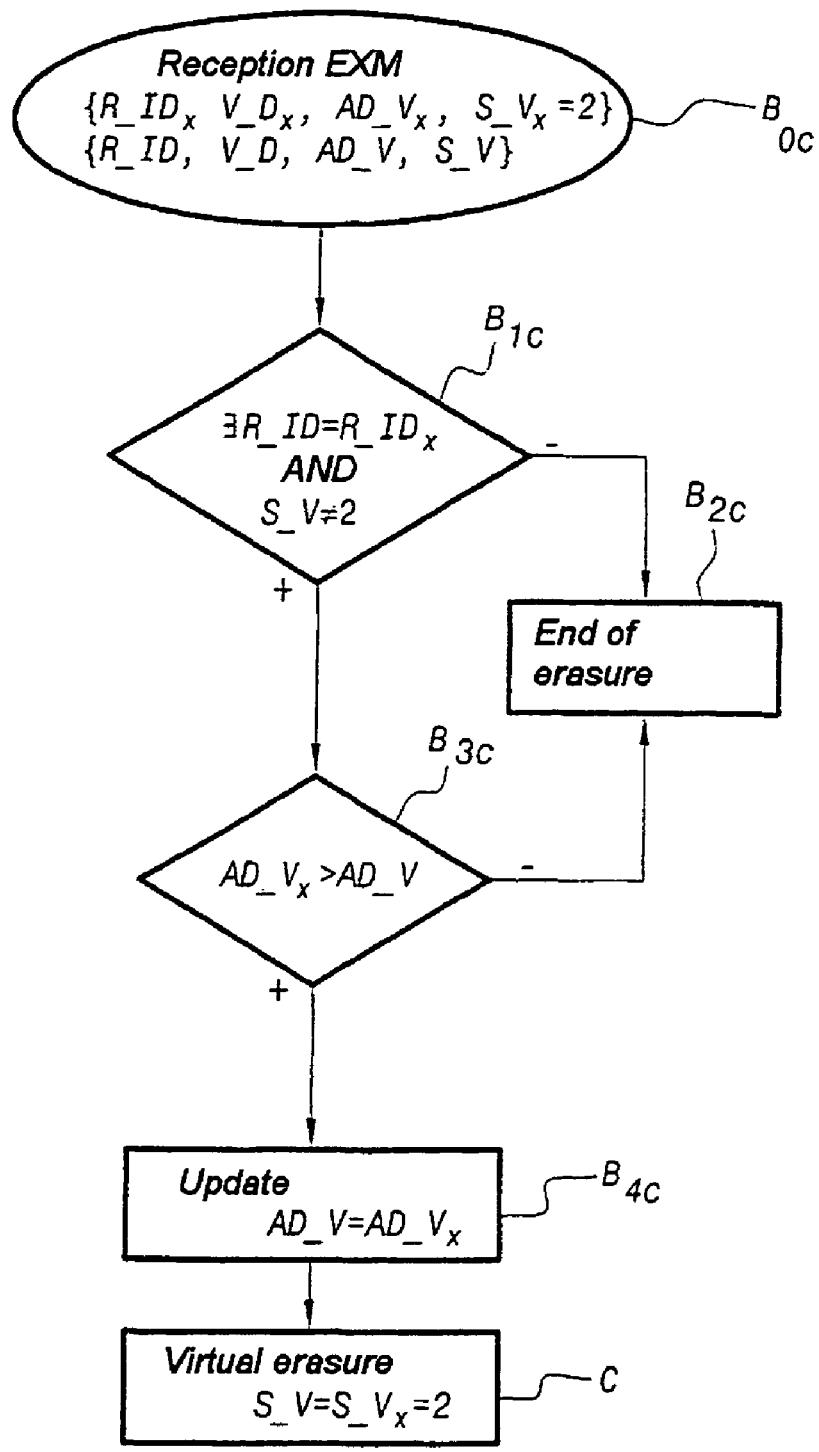
FIG. 2c represents, by way of illustration, a specific flow diagram of the steps for implementing the protocol that is the object of the present invention, in an operation to erase an entered access right, the erasure operation corresponding to a virtual erasure, given the fact that the physical erasure of this right is momentarily deferred.

In these conditions, as represented in FIG. 2c, the erasure operation begins, on a descrambling terminal $T_k$, with the receipt of an EXM message and there are then the variables previously described in the description, for the entry or disabling operations, but with the status assignment variable $S\_V_x = 2$.

The erasure operation is performed for an access right in the access control module for which the status variable corresponds to an enabled right or a disabled right.

In these conditions, the step for receiving the EXM message, $B_{0c}$, is followed by a test step $B_{1c}$ consisting in verifying the existence on the access control module of a corresponding entered access right. The aforementioned test $B_{1c}$ is similar to the test $B_{1a}$ or $B_{1b}$ in FIGS. 2a or 2b, and verifies the same relation. On a negative response to the test of step $B_{1c}$, an end-of-erasure step $B_{2c}$ is invoked. On a positive response to the test $B_{1c}$, the latter is followed by a step $B_{3c}$ to verify the posteriority of the action date variable of the management message $AD\_V_x$, with respect to the action date variable of the entered right $AD\_V$. This step is performed by comparing superiority according to the relation:

$$AD\_V_x > AD\_V.$$

On a negative response to the aforementioned test $B_{3c}$, the return to the call for end-of-erasure step $B_{2c}$ can be performed in conditions similar to those at the end of disabling of a right described in conjunction with FIG. 2b.

Contrary to this, on a positive response to the test of step $B_{3c}$, the erasure operation, according to the protocol that is the object of the present invention, can consist in the call to a step to update the action date of the entered right, step $B_{4c}$, according to the relation:

$$AD\_V = AD\_V_x.$$

The aforementioned update step is then followed by the erasure step proper, in step C, to perform a virtual erasure of the entered access right.

According to a particularly advantageous embodiment of the protocol that is the object of the present invention, the virtual erasure step consists in an allocation, to the status variable of the entered right $S\_V$, of the status assignment variable of the management message $S\_V$ corresponding to an erased access right, namely $S\_V_x=2$.

The virtual erasure concept in fact covers the concept of maintaining the physical existence of the access right entered in the non-volatile memory of the access module, while, however, this right is made unusable simply by assigning the encoded value corresponding to an erased access right.

According to a particularly advantageous embodiment of the protocol that is the object of the present invention, the virtual erasure step of an entered access right can correspond to a total absence of the possibility of using this right, although the latter is still physically present in the non-volatile memory of the access control module including the latter. The erasure operation proper, in other words the physical erasure of any entered access right, can then be performed systematically, independently of the access control and of the access of the subscriber to the scrambled data corresponding to the access right concerned.

Figure 2D:
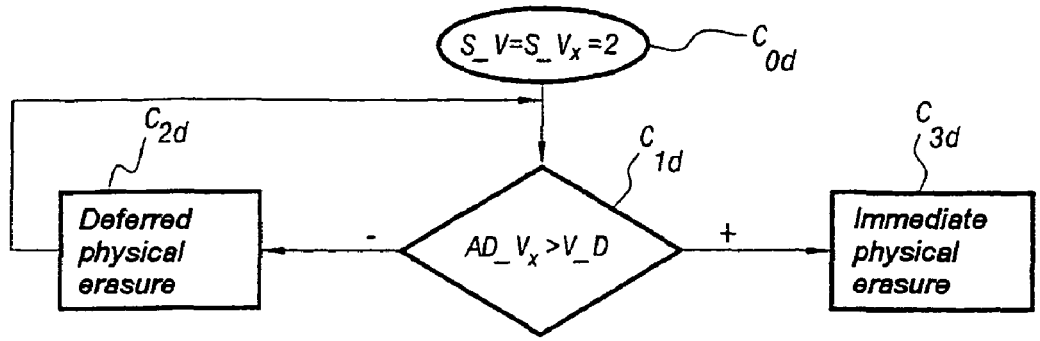
FIG. 2d represents, by way of illustration, a specific flow diagram of the introduction of a physical erasure of an entered access right, conditional on a specific criterion, such as a time-oriented criterion, for example.

In particular, as represented in FIG. 2d, the physical erasure of the access right previously submitted to a virtual erasure state can be either immediate or deferred.

If appropriate, the execution of the physical erasure state can be conditional upon a specific criterion, such as a time-oriented criterion, as will be described in greater detail in conjunction with FIG. 2d.

Referring to the aforementioned figure, an entered access right is considered to be in the virtual erasure state, following the implementation of the protocol that is the object of the present invention, in accordance with the embodiment illustrated and described previously in the description, in conjunction with FIG. 2c.

In this situation, an EXM message, with $S\_V_x=2$, has been received and the virtual erasure situation corresponds to the relation described previously in the description $S\_V = S\_V_x = 2$. The corresponding virtual erasure state is represented by the state $C_{0d}$ in FIG. 2d.

The execution of the physical erasure proper of the entered right can then be subject to a test such as a time-oriented test, in step $C_{1d}$.

The aforementioned test can, as a non-limiting example, consist in comparing the action date variable of the EXM message, namely the variable $AD\_V_x$, by a superiority comparison, with the end-of-validity date variable $V\_D$ of the entered right.

On a positive response to the test $C_{1d}$, since the erasure action date is later than the validity date of the entered right, physical erasure is performed immediately by calling a corresponding step $C_{3d}$.

Contrary to this, on a negative response to the test $C_{1d}$, since the erasure action date is earlier than the end-of-validity date $V\_D$ of the entered right, a deferred physical erasure step is called $C_{2d}$. The erasure is deferred as long as the action date $AD\_V_x$ of all successive EXM erasure messages is less than or equal to the end-of-validity date of the entered right. The maintaining of the deferred physical erasure is symbolized by the return to the test $C_{1d}$.

It is understood that, by implementing the aforementioned deferred erasure, it is possible to provide a systematic management of the physical erasure of the entered access rights while the latter, although still physically present on the card, are unusable by the subscriber whose corresponding entered right has been placed in a virtual erasure situation.

A comparative example of implementation of erasure or deletion of a right, in accordance with the prior art, and then in accordance with the protocol that is the object of the present invention, will now be given below in the description in the case where it is assumed, for a given subscriber, that there is no access control module, in other words there is no card allocated to the latter in the descrambling terminal or decoder or, if appropriate, operation of the decoder is unavailable for a period of time defined with respect to the cyclic transmission of management messages, EMM messages in the case of the prior art, EXM messages in accordance with the protocol that is the object of the present invention.

The example therefore considers the cyclic broadcasting of management messages of the EMM type in the case of prior art procedures and of the EXM type on implementation of the protocol that is the object of the present invention.

The example considers, according to table 1 relating to the prior art procedure, the transmission of a cycle of EMM type management messages according to a first cycle, as represented in the table, while during the corresponding action dates, according to the cells of area A in the cycle 1 table, the access control module or the descrambling terminal is out of service.

TABLE 1

| Message type | Action date | Action on the card |
|---|---|---|
| Cycle .../... | 01/12/01 | Prior to 01/12/01 |
| 1  $R\_ID_1$ entry EMM | | Right entered $R\_ID_1$ |
| $R\_ID_1$ deletion EMM | 02/12/01 | Right erased $R\_ID_1$ |
| $R\_ID_2$ entry EMM | 12/12/01 | Right entered $R\_ID_2$ |

TABLE 1-continued

| | Message type | Action date | Action on the card | |
|---|---|---|---|---|
| | $R\_ID_3$ entry EMM | 13/12/01 | | ⎫ |
| | $R\_ID_4$ entry EMM | 12/12/01 | | ⎬ A |
| | EMM .../... | .../... | | ⎭ |
| Cycle 2 | $R\_ID_5$ entry EMM | 31/12/01 | Right entered $R\_ID_5$ | |
| | Right $R\_ID_5$ deletion EMM | 01/01/02 | Right erased $R\_ID_5$ | |
| | $R\_ID_6$ entry EMM | 12/01/02 | Right entered $R\_ID_6$ | |
| | EMM .../... | | | |
| n Cycle 1 | $R\_ID_1$ entry EMM | 01/12/01 | Right entered $R\_ID_1$ | ⎫ |
| | $R\_ID_1$ deletion EMM | 02/12/01 | Right erased $R\_ID_1$ | ⎬ |
| | $R\_ID_2$ entry EMM | 12/12/01 | Right already entered | ⎬ B |
| | $R\_ID_3$ entry EMM | 13/12/01 | Right entered $R\_ID_3$ | ⎬ |
| | $R\_ID_4$ entry EMM | 12/12/01 | Right entered $R\_ID_4$ | ⎬ |
| | EMM .../... | | | ⎭ |

In the aforementioned table 1, it should be remembered that the action date designates the message transmission date, but that this message however includes no action date, unlike the EXM messages used to implement the protocol that is the object of the present invention.

Cycle 1 is followed by a cycle 2 with different dates then, next, a plurality of cycles 1, one of the cycles being designated by n cycle 1.

On transmission of the first cycle 1, any operation to enter a right or delete a right, in other words erasure, is performed except, naturally, with regard to the cells in area A in which the access control module, in other words the card and/or the descrambling terminal, is out of service.

On transmission of a cycle 2, different from cycle 1, with respect to the identification variable of the entered access rights since the access control module and/or the terminal are/is in service, the corresponding operations are, in the same way, executed.

Contrary to this, on repetition of cycle 1, in other words in table 1, for the cells of the cycle denoted n cycle 1, cells appear corresponding to an area B, this area indicating that the transmitted right $R\_ID_1$ successively entered and erased cannot effectively be established as such in the access control module, in other words in the card, because no control by action date is performed.

While the procedure according to the prior art does not allow for non-reentry of erased rights to be controlled, table 2, relating to the implementation of the protocol that is the object of the present invention, in a similar situation, reduces the cases in which the EXM management messages introduce malfunctions in the conditions below.

TABLE 2

| | Message type | Action date | Right status on the card | |
|---|---|---|---|---|
| Cycle 1 | .../... | | | |
| | $R\_ID_1$ entry EXM | 01/12/01 | Right entered | |
| | $R\_ID_1$ disabling EXM | 02/12/01 | Disabled | I |
| | $R\_ID_2$ entry EXM | 12/12/01 | Right entered | |

TABLE 2-continued

| | Message type | Action date | Right status on the card | |
|---|---|---|---|---|
| | $R\_ID_3$ entry EXM | 13/12/01 | | ⎫ |
| | $R\_ID_4$ entry EXM | 12/12/01 | | ⎬ A |
| | Right $R\_ID_4$ disabling EXM | 13/12/01 | | ⎬ |
| | EXM .../... | .../... | | ⎭ |
| Cycle 2 | $R\_ID_5$ entry EXM | 31/12/01 | Right entered | |
| | Right $R\_ID_5$ disabling EXM | 01/01/02 | Disabled | I |
| | $R\_ID_6$ entry EXM | 12/01/02 | Right entered | |
| | EXM .../... | | | |
| n Cycle 1 | $R\_ID_1$ entry EXM | 01/12/01 | Message disregarded | ⎫ |
| | $R\_ID_1$ disabling EXM | 02/12/01 | Message disregarded | ⎬ |
| | $R\_ID_2$ entry EXM | 12/12/01 | Message disregarded | ⎬ i |
| | $R\_ID_3$ entry EXM | 13/12/01 | Right entered | ⎬ |
| | $R\_ID_4$ entry EXM | 12/12/01 | Right entered | ⎬ |
| | Right $R\_ID_4$ disabling EXM | 13/12/01 | Disabled | I |
| | EXM .../... | .../... | | |

In these conditions, the processing rules in the access control module are as follows:
on disabling, the right is marked as disabled I;
a disabled right can be reactivated only conditionally:
if the action date, in other words the action date variable of the EXM message, is less than or equal to the action date of the entered right, the action of the message is disregarded in the card i;
if the action date of the EXM message is greater than the action date of an entered right, the entered right is reupdated, in other words actually updated as disabled or erased.

In table 2, as in table 1, the area A corresponds to a downtime or period of malfunction of the access control module and/or of the descrambling terminal for cycle 1.

The areas i indicate that the entered right has been disabled by the disabling message, namely $S\_V=S\_V_x=0$;
the cells of area i refer to the situation according to which, if the action date of the EXM message is less than or equal to the action date of the entered but disabled right, the corresponding action is disregarded in the access control module.

This shows the existence of a more flexible and more fluid processing and management of all the access rights entered in the access control modules.

For the implementation of the protocol that is the object of the present invention, it is important, naturally, to have a descrambling terminal linked to a module controlling access to the scrambled data transmitted from a transmission center to the aforementioned descrambling terminal.

Figure 3A:
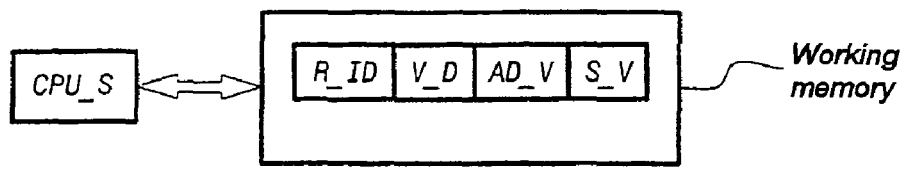
FIGS. 3a and 3b represent an access control module according to the invention.

As represented in FIG. 3a, it is indicated that the access control module linked to the corresponding descrambling terminal comprises, entered in this access control module's memory, at least one access right formed by a set of independent variables and linked variables, this set comprising at least, in addition to an identification variable R_ID of the entered right, an entered access right action date variable AD_V and a status variable that can take one of the three encoded values mentioned previously in the description to represent an enabled access right, a disabled access right or even an erased access right. The access control module can, moreover, include a validity dates variable, V_D.

As a general rule, it is indicated that the access control module can comprise a software element or a hardware element and, in particular, a virtual card to embody the aforementioned software element or a microprocessor card fitted with the security processor, as mentioned previously in the description.

When the access control module is a software element, the latter can be located in the descrambling terminal, for example. In this case, as represented in FIG. 3a, the access right formed by the aforementioned set of independent variables and linked variables can then be stored in a permanent memory such as a hard disk, for example, not shown in the drawings, and systematically loaded into the working memory of the descrambling terminal, the working memory naturally being connected to the security processor CPU_S of the descrambling terminal.

Figure 3B:
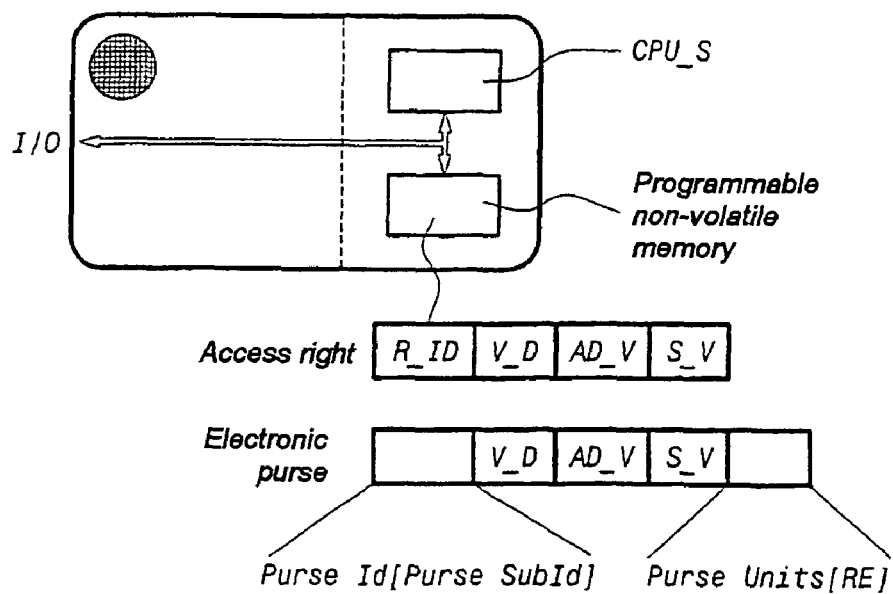

When, contrary to this, the access control module comprises a microprocessor card fitted with a security processor, as represented in FIG. 3b, this microprocessor card is also fitted with a secured non-volatile programmable memory linked to the security processor. In such a case, as represented in the aforementioned FIG. 3b, the access rights formed by a set of independent variables and linked variables are entered in the secured non-volatile programmable memory.

It is understood, in particular, that, with a bus link to the card's input/output circuits, denoted I/O, the interchange of instructions from the descrambling terminal either to enter an access right or to disable an access right, or on the contrary to erase an access right from the programmable non-volatile memory, can be embodied by the aforementioned input/output circuits I/O under the control of the security processor CPU_S mentioned previously.

Finally, referring to the same FIG. 3b, and in the more particular case of a scrambled data access control service, access to this data being granted subject to payment, such as, for example, in the case of a pay television service, the concept of access right formed by a set of independent variables and linked variables and defining the modes of access to the scrambled data covers the electronic purses allocated to the subscribing user holding the access control module.

For this reason, FIG. 3b shows a representation of an electronic purse encoded in a way similar to that of an access right AR, the electronic purse possibly including, in the same way, as an example:

an electronic purse identification variable denoted Purse Id;
a validity dates variable V_D;
an electronic purse action date variable AD_V;
a status variable S_V.

Finally, an account units variable can be provided, denoted Purse Units.

It is indicated that the electronic purse identification variable can be linked to a linked variable denoted Purse SubId, this variable according to the preceding notation conventions relating to the access right AR being, for example, an optional variable.

In these conditions, it is understood that, for a given electronic purse, referenced Purse Id, it is possible to define sub-purses, each defined by the Purse SubId variable, for specific applications and particular services.

The same applies with respect to the Purse Units variable, to which can be linked an optional linked variable RE, according to the same conventions. The linked variable RE can designate a "carry" variable used to carry over the content of the electronic purse concerned or the credit balance of the latter to an electronic purse of the same type or to the same electronic purse with an identical identifier.

In these conditions, and equally in the case of access rights AR, the encoding syntax of the electronic purses, similar to that of the access rights AR, takes the form:

PU=Purse Id [Purse SubId] V_D AD_V S_V Purse Units [RE].

The invention claimed is:

1. A method of entering, disabling/erasing scrambled data access rights transmitted from a transmission center to at least one descrambling terminal to which is linked an access control module device equipped with a security processor, these access rights being entered in said access control module, said scrambled data being subjected to an access control by periodic transmission of access control messages, conveying access criteria and a cryptogram of a control word that is changed periodically and encrypted using an operation key, then, in each security processor, conditionally upon verifying a validity of at least one entered access right against said access criteria, by decrypting the cryptogram of the control word using said operation key, transmitting said control word to the descrambling terminal and descrambling said scrambled data using said restored control word, characterized in that it consists at least in:

forming any access right entered in said access control module device as a set of independent variables comprising at least:
an access right identification variable corresponding to at least an identifier of the entered right and used to reference this right in the access criteria conveyed by the access control messages,
an entered access right action date variable indicating the date of entry of the right entered in the access control module when no operation has been performed on said right or the date of execution of the last subsequent operation performed on said right, and
a status variable which can have one of three encoded values signifying access right enabled, access right disabled, or access right erased;
forming said any access right with linked variables linked to said independent variables;
transmitting from said transmission center to each descrambling terminal and to the access control module device linked to said descrambling terminal at least one access right management message, said message comprising at least, in addition to an entered access right identification variable, an action date variable and a status assignment variable, the encoded value corresponding to an enabled access right, a disabled access right or an erased access right; and on receipt of said access right management message, at said access control module,
checking and authorization of an update operation by comparing a value of the entered access right action date variable of the access right entered in the access control module device to the action date variable of the access right management message and the value of the status variable of the access right;
assigning said action date to the entered access right corresponding to the access right identification variable of said access right management message, and
allocating said status assignment variable corresponding to an enabled access right, a disabled access right or an erased access right to said status variable of said corresponding entered access right.

2. The method as claimed in claim 1, characterized in that, for an operation to enter a defined access right in an access control module, said action date variable of said access right management message corresponds to an entry date, and the status assignment variable is an encoded value corresponding to an enabled right, the entry operation consisting in entering, into said access control module, a defined access right, the action date of which is that of said entry date and for which the status variable is that of said status assignment variable and corresponds to an enabled right.

3. The method as claimed in claim 2, characterized in that, prior to the entry operation of said defined access right, said method consists in addition, in said access control module, in checking a presence, in said access control module, of an entered access right corresponding to said defined access right and for which the status variable corresponds to the encoded value signifying right enabled or right disabled, and on a positive response to said verification:

in verifying the posteriority nature of said action date variable corresponding to an entry date in relation to the action date of said identical access right and on a positive response to said posteriority nature verification, performing an update of said action date variable of said identical access right, based on said action date corresponding to an entry date, assigning, to said status variable of said identical access right, the encoded value corresponding to an enabled right, allowing said entered access right to be enabled.

4. The method as claimed in claim 2, characterized in that, on a negative response to said verification of the existence of an identical access right, said method including an update of said identical access right with a first entry of this access right, for which the action date corresponds to the entry date.

5. The method as claimed in claim 2, characterized in that, for an entered access right for which the status assignment variable corresponds to an erased access right, said method also consists in performing an update by first entry of this access right, said access right being assigned a status variable corresponding to an enabled right and for which the action date corresponds to the entry date.

6. The method as claimed in claim 1, characterized in that, for an operation to disable an access right entered in an access control module, said action date variable of said access right management message corresponds to a disabling date and the status assignment variable is an encoded value corresponding to a disabled right, the disabling operation consisting in assigning, to said status variable of said entered access right, said encoded value corresponding to a disabled right and updating said action date of said entered access right based on said disabling date.

7. The method as claimed in claim 5, characterized in that, prior to the disabling operation, said method consists in:

verifying the existence, on said access control module, of an entered access right corresponding to said access right of said management message;

verifying the posteriority nature of said action date variable corresponding to a disabling date with respect to said action date variable of said entered right.

8. The method as claimed in claim 6, characterized in that, for an entered access right for which the status assignment variable corresponds to an erased access right, said method also consists in performing an update by first entry of this access right, said access right being assigned a status variable corresponding to a disabled right and for which the action date corresponds to the entry date.

9. The method as claimed in claim 6, characterized in that, on a negative response to said verification of the existence of a corresponding access right, said method also consists in performing an update by first entry of this access right, for which the action date corresponds to a disabling date, said access right being assigned a status variable corresponding to a disabled right.

10. The method as claimed in claim 1, characterized in that, for any status assignment variable of the management message corresponding to an erased access right and for any access right entered in the access control module device for which the status variable corresponds to an enabled right or a disabled right, said method consists at least in:

an update of the action date of said entered right;

an allocation, to said status variable of said entered access right, of said status assignment variable of the management message corresponding to an erased access right, said allocation operation forming, for said entered access right, a virtual erasure operation.

11. The method as claimed in claim 10, characterized in that the update and virtual erasure steps of said entered access right are preceded by a step to verify the existence, on said access control module, of an entered access right corresponding to said access right of said management message, and a step to verify the posteriority of said action date variable of said management message with respect to said action date variable of said entered access right.

12. The method as claimed in claim 7, characterized in that said virtual erasure operation is followed by a physical erasure operation of said access right.

13. The method as claimed in claim 12, characterized in that said physical erasure operation is immediate or deferred.

14. An access control module device controlling access to scrambled data transmitted from a transmission center to at least one descrambling terminal to which is linked said access control module device, characterized in that it comprises, entered in the memory of this access control module, at least one access right formed by a set of independent variables comprising at least:

an entered access right identification variable corresponding to at least an identifier of the entered right and used to reference this right in the access criteria conveyed by the access control messages, an entered access right action date variable indicating the date of entry of the right entered in the access control module when no operation has been performed on said right or the date of execution of the last subsequent operation performed on said right, and a status variable which can have one of three encoded values signifying access right enabled, access right disabled, or access right erased;

wherein the access right is also formed by linked variables linked to said independent variables; and wherein checking and authorization of an update operation are done by comparing a value of the entered access right action date variable of the access right entered in the memory of the access control module device to an action date variable of an access right management message and the value of the status variable of the access right.

15. The access control module device as claimed in claim 14, characterized in that since said access control module device comprises a microprocessor card fitted with a security processor and a secured non-volatile programmable memory, said at least one access right is entered in said secured non-volatile programmable memory.

* * * * *